United States Patent Office.

OSCAR A. DAY AND GEORGE W. BISHOP, OF SARATOGA SPRINGS, NEW YORK.

Letters Patent No. 65,179, dated May 28, 1867.

---

IMPROVED COMPOSITION FOR COATING ROOFING, &c.

---

*The Schedule referred to in these Letters Patent and making part of the same.*

---

TO ALL WHOM IT MAY CONCERN:

Be it known that we, OSCAR A. DAY and GEORGE W. BISHOP, of Saratoga Springs, Saratoga county, New York, have invented a new and improved Composition; and we do hereby declare that the following is a full, clear, and exact description thereof, which will enable others skilled in the art to make and use the same.

The present invention relates to an improved composition to be used as a covering or coating to roofs, or the boards or other surface composing the same, to which such composition will adhere, and as a protective covering to woods or other material.

This composition is divided or made up in the form of two mixtures; the one being applied first, and the other over and upon the outside of the layer or coating thus formed. The two mixtures are made of the ingredients hereinafter named, that are mixed together in or about the proportions below stated.

The first mixture is composed of three parts of sand, one part of cement, with a sufficient quantity of lime to reduce it to the consistency of common brown mortar.

And the second mixture of four parts of cement, two parts of ground clay, two parts of fine sifted sand, three parts of coal tar, and one part of a rubber combination or compound that is formed by mixing together five parts of India rubber or gutta percha or other similar substance, two parts of tallow or lard or their respective equivalents, and one part of resin and spirits of turpentine, mixed together in equal proportions or thereabouts.

Having thus described our invention, we claim as new, and desire to secure by Letters Patent—

The composition substantially as herein described and for the purpose specified.

The above specification of our invention signed by us this    day of    , 1867.

OSCAR A. DAY,
GEORGE W. BISHOP.

Witnesses:
CHAS. H. BENEDICT,
F. C. PHILLIPS.